United States Patent
Clement et al.

(10) Patent No.: US 10,124,603 B2
(45) Date of Patent: Nov. 13, 2018

(54) METHODS FOR MANUFACTURING PANELS HAVING A DECORATIVE SURFACE

(71) Applicants: UNILIN, BVBA, Wielsbeke (BE); AGFA, NV, Mortsel (BE)

(72) Inventors: Benjamin Clement, Waregem (BE); Laurent Meersseman, Kortrijk (BE); Patrick Van Den Bergen, Hove (BE); Rudi Vanhooydonck, Zwijndrecht (BE)

(73) Assignees: UNILIN, BVBA, Wielsbeke (BE); AGFA, NV, Mortsel (BE)

( * ) Notice: Subject to any disclaimer, the term of this patent is extended or adjusted under 35 U.S.C. 154(b) by 0 days.

(21) Appl. No.: 15/115,020

(22) PCT Filed: Feb. 3, 2015

(86) PCT No.: PCT/IB2015/050823
§ 371 (c)(1),
(2) Date: Jul. 28, 2016

(87) PCT Pub. No.: WO2015/118451
PCT Pub. Date: Aug. 13, 2015

(65) Prior Publication Data
US 2016/0347084 A1   Dec. 1, 2016

(30) Foreign Application Priority Data
Feb. 6, 2014 (EP) .................................. 14154197

(51) Int. Cl.
*B05D 7/06* (2006.01)
*B41J 3/407* (2006.01)
(Continued)

(52) U.S. Cl.
CPC ............... *B41J 3/407* (2013.01); *B05D 7/06* (2013.01); *B32B 21/02* (2013.01); *B32B 21/08* (2013.01);
(Continued)

(58) Field of Classification Search
CPC ..... B41J 3/407; B41J 2/14; B05D 7/06; E04F 13/0871; E04F 13/0894; E04F 13/10;
(Continued)

(56) References Cited

U.S. PATENT DOCUMENTS 3,769,143 A   10/1973  Kulesza
3,983,307 A   9/1976   Power et al.
(Continued)

FOREIGN PATENT DOCUMENTS

CA   1064778       10/1979
CN   1973089 A     5/2005
(Continued)

OTHER PUBLICATIONS

Z. Lu et al., "Layer-by-layer nanoparticle coatings on lignocellulose wood microfibers", Colloids and Surfaces A: Physicochem. Eng. Aspects 292 (2007), Jun. 20, 2006, p. 56-62.
(Continued)

*Primary Examiner* — Julian Huffman
*Assistant Examiner* — Michael Konczal
(74) *Attorney, Agent, or Firm* — Capitol City TechLaw

(57) ABSTRACT

Method for manufacturing panels having a decorative surface, wherein the panels at least comprise a substrate and a top layer, wherein the top layer comprises a paper layer having a printed pattern, and wherein the method at least comprises the step of providing the paper layer with thermosetting resin by transporting the paper layer through a resin application device in a resin application direction, and the step of providing the paper layer with at least a portion of the printed pattern by means of a digital inkjet printer, wherein the printed pattern comprises a wood motif having wood nerves extending generally in a nerve direction substantially corresponding to the resin application direction.

10 Claims, 4 Drawing Sheets

(51) Int. Cl.

| | |
|---|---|
| *B44C 5/04* | (2006.01) |
| *B41M 5/52* | (2006.01) |
| *B32B 21/02* | (2006.01) |
| *B32B 21/08* | (2006.01) |
| *B32B 37/00* | (2006.01) |
| *B41J 2/14* | (2006.01) |
| *E04F 13/08* | (2006.01) |
| *E04F 13/10* | (2006.01) |
| *E04F 15/02* | (2006.01) |
| *E04F 15/04* | (2006.01) |

(52) U.S. Cl.
CPC ............ *B32B 37/0038* (2013.01); *B41J 2/14* (2013.01); *B41M 5/52* (2013.01); *B44C 5/0469* (2013.01); *E04F 13/0871* (2013.01); *E04F 13/0894* (2013.01); *E04F 13/10* (2013.01); *E04F 15/02038* (2013.01); *E04F 15/04* (2013.01); *B32B 2255/12* (2013.01); *B32B 2255/26* (2013.01); *B32B 2471/00* (2013.01); *E04F 2201/0153* (2013.01); *E04F 2201/023* (2013.01)

(58) Field of Classification Search
CPC ............... E04F 15/04; E04F 15/02038; E04F 2201/0153; E04F 2201/023; B32B 21/02; B32B 21/08; B32B 37/0038; B32B 2471/00; B32B 2255/26; B32B 2255/12
See application file for complete search history.

(56) References Cited

U.S. PATENT DOCUMENTS

| | | |
|---|---|---|
| 4,006,048 A | 2/1977 | Cannady, Jr. et al. |
| 4,076,566 A | 2/1978 | Power |
| 4,895,759 A | 1/1990 | Crawford |
| 5,227,359 A | 7/1993 | Mikoshiba et al. |
| 5,296,447 A | 3/1994 | Suto et al. |
| 5,407,895 A | 4/1995 | Egashira et al. |
| 5,478,631 A | 12/1995 | Kawano et al. |
| 5,494,885 A | 2/1996 | Kudo et al. |
| 5,612,280 A | 3/1997 | Takahashi et al. |
| 5,639,539 A | 6/1997 | DeProspero et al. |
| 5,712,222 A | 1/1998 | Shirai et al. |
| 5,939,231 A | 8/1999 | Kawamura et al. |
| 5,989,378 A | 11/1999 | Liu et al. |
| 6,132,878 A | 10/2000 | Kojima et al. |
| 6,291,127 B1 | 9/2001 | Dagan et al. |
| 6,300,279 B1 | 10/2001 | Macedo |
| 6,455,206 B1 | 9/2002 | Hasegawa et al. |
| 6,517,674 B1 | 2/2003 | Das |
| 6,551,694 B1 | 4/2003 | Imamichi et al. |
| 6,599,592 B1 | 7/2003 | Schulz |
| 6,605,337 B1 | 8/2003 | Mori et al. |
| 6,632,488 B2 | 10/2003 | Okumura et al. |
| 6,652,931 B1 | 11/2003 | Otani et al. |
| 6,677,006 B2 | 1/2004 | Otani et al. |
| 6,677,008 B2 | 1/2004 | Chen et al. |
| 6,706,372 B2 | 3/2004 | Schulz et al. |
| 6,773,104 B2 | 8/2004 | Cornelius et al. |
| 6,821,584 B2 | 11/2004 | Tashiro et al. |
| 6,835,676 B2 | 12/2004 | Kim et al. |
| 6,843,560 B2 | 1/2005 | Romano, Jr. et al. |
| 7,026,023 B2 | 4/2006 | Masuda et al. |
| 7,029,096 B2 * | 4/2006 | Weijkamp ............... B41J 2/2103 347/40 |
| 7,335,407 B2 | 2/2008 | Landry-Coltrain et al. |
| 7,695,783 B2 | 4/2010 | Merkel et al. |
| 7,854,799 B2 | 12/2010 | Hoogmartens |
| 8,085,442 B2 * | 12/2011 | De Waal ............... B41M 3/00 347/174 |
| 8,316,604 B2 * | 11/2012 | Thiers ............... B44C 1/24 428/172 |
| 8,328,303 B2 * | 12/2012 | Frati ............... B41J 3/407 347/1 |
| 8,500,230 B2 * | 8/2013 | Thiers ............... B32B 38/145 101/484 |
| 8,771,811 B2 | 7/2014 | Takahashi et al. |
| 9,321,278 B2 | 4/2016 | Clement et al. |
| 9,566,823 B2 | 2/2017 | Clement et al. |
| 2001/0036552 A1 | 11/2001 | Otani et al. |
| 2002/0043175 A1 | 4/2002 | Walker et al. |
| 2003/0068473 A1 | 4/2003 | Okumura et al. |
| 2003/0138599 A1 | 7/2003 | Kamikubo |
| 2003/0148073 A1 | 8/2003 | Landry-Coltrain et al. |
| 2004/0081773 A1 | 4/2004 | Ishida et al. |
| 2004/0141041 A1 | 7/2004 | Tsutsumi et al. |
| 2004/0209011 A1 | 10/2004 | Kondo et al. |
| 2005/0171245 A1 | 8/2005 | Ni et al. |
| 2005/0191443 A1 | 9/2005 | Sunagawa et al. |
| 2005/0221024 A1 | 10/2005 | Teshima et al. |
| 2006/0060101 A1 | 3/2006 | Nasser |
| 2006/0088672 A1 | 4/2006 | Totani et al. |
| 2006/0130421 A1 | 6/2006 | Nollet et al. |
| 2006/0234027 A1 | 10/2006 | Huusken |
| 2006/0279621 A1 | 12/2006 | Morohoshi |
| 2007/0202263 A1 | 8/2007 | Kitamura et al. |
| 2007/0283648 A1 | 12/2007 | Chen |
| 2008/0090032 A1 | 4/2008 | Perrin et al. |
| 2008/0318008 A1 | 12/2008 | Wielstra et al. |
| 2010/0047455 A1 | 2/2010 | Hoogmartens |
| 2010/0253735 A1 | 10/2010 | Irita |
| 2010/0282407 A1 | 11/2010 | van der Zwan et al. |
| 2011/0211012 A1 | 9/2011 | Irita |
| 2012/0021147 A1 | 1/2012 | Liao |
| 2013/0070017 A1 | 3/2013 | Fujii et al. |
| 2013/0286088 A1 | 10/2013 | Ryberg et al. |
| 2014/0370209 A1 | 12/2014 | Walp |

FOREIGN PATENT DOCUMENTS

| | | |
|---|---|---|
| CN | 1628968 | 6/2005 |
| CN | 101014468 A | 8/2007 |
| CN | 101084125 | 12/2007 |
| CN | 101925705 A | 12/2010 |
| CN | 102501698 | 6/2012 |
| CN | 101998896 | 12/2014 |
| DE | 19725829 C1 | 6/1997 |
| DE | 19715268 A1 | 10/1998 |
| DE | 19916546 A1 | 10/2000 |
| DE | 19945279 C1 | 4/2001 |
| DE | 19955081 C1 | 8/2001 |
| DE | 102004036664 | 3/2006 |
| DE | 102004036922 A1 | 3/2006 |
| DE | 102007013135 A1 | 9/2008 |
| EP | 0054405 A1 | 6/1982 |
| EP | 0737591 A1 | 10/1996 |
| EP | 1044822 A1 | 10/2000 |
| EP | 1108529 A2 | 6/2001 |
| EP | 1700689 A1 | 9/2006 |
| EP | 1749676 A1 | 2/2007 |
| EP | 1923223 | 5/2008 |
| EP | 1872959 B1 | 7/2009 |
| EP | 2132041 B1 | 12/2009 |
| EP | 1290290 B1 | 1/2010 |
| EP | 2293946 B1 | 3/2011 |
| EP | 1857511 B1 | 9/2011 |
| EP | 2402154 A1 | 1/2012 |
| EP | 2431190 A2 | 3/2012 |
| EP | 2695745 A1 | 2/2014 |
| JP | 8-197697 | 8/1996 |
| JP | 10-747 | 1/1998 |
| JP | 2001071447 A | 3/2001 |
| JP | 2002-316397 A | 10/2002 |
| WO | 9935335 | 7/1999 |
| WO | 0196689 A1 | 12/2001 |
| WO | 2004042168 A1 | 5/2004 |
| WO | 2004074577 A1 | 9/2004 |
| WO | 2005028750 A1 | 3/2005 |
| WO | 2005116337 A1 | 12/2005 |
| WO | 2006013469 A1 | 2/2006 |
| WO | 2006130708 A2 | 12/2006 |

(56) References Cited

FOREIGN PATENT DOCUMENTS

| WO | 2007119888 A1 | 10/2007 | | |
|---|---|---|---|---|
| WO | 2008110275 A1 | 9/2008 | | |
| WO | WO 2008110254 A1 * | 9/2008 | ............. | B32B 27/04 |
| WO | 2008134823 A1 | 11/2008 | | |
| WO | WO 2008134823 A1 * | 11/2008 | ........... | B44C 5/0469 |
| WO | 2009077561 A1 | 6/2009 | | |
| WO | 2009080376 A1 | 7/2009 | | |
| WO | 2009124704 A1 | 10/2009 | | |
| WO | 2009153680 A2 | 12/2009 | | |
| WO | 2010000358 A1 | 1/2010 | | |
| WO | 2011124503 A2 | 10/2011 | | |

OTHER PUBLICATIONS

Safety Data Sheet, HP Tinte C1892A—Black, Admitted prior art.
G. A. Smook, Handbook of pulp & paper terminology: a guide to industrial and technological usage, 2nd edition, Angus Wilde Publications Inc., 2001, p. 246.
HP DesignJet 2500/2000CP Printer User's Guide, C4704A/C4703A, Admitted prior art, p. 1-340.
Material Safety Data Sheet, HP Tinte C1893A—No. 93 Cyan, Admitted prior art.
Material Safety Data Sheet, HP Tinte C1895A—No. 95 Yellow, Admitted prior art.
Material Safety Data Sheet, HP Tinte C1894A—No. 94 Magenta, Admitted prior art.
Hue P. Le, "Progress and Trends in Ink-jet Printing Technology", Journal of Imaging Science and Technology, vol. 42, No. 1, Jan./Feb. 1998, p. 49-62.
Shlomo Magdassi, "The Chemistry of Inkjet Inks", World Scientific Publishing Co., Pte. Ltd., 2010, Chapter 7.
M. J. Moura et al., "The Use of Mercury Intrusion Porosimetery to the Characterization of Eucalyptus Wood, Pulp and Paper", Iberoamerican Congress on Pulp and Paper Research 2002, p. 1-7.
Monica Badila et al., "Evaluation of the compatibility between low pressure melamine (LPM) film printing substrates and inkjet inks," Eur. J. Wood Prod., 2012, p. 639-649, published online.

\* cited by examiner

METHODS FOR MANUFACTURING PANELS HAVING A DECORATIVE SURFACE

This application claims priority under 35 USC § 119(a)-(d) to EP patent application No. 14154197.9, which was filed on Feb. 6, 2014, the entire contents of which are incorporated herein by reference.

BACKGROUND OF THE INVENTION

1. Field

The present invention relates to methods for manufacturing panels having a decorative surface, or, so-called decorative panels.

More particularly the invention is related to methods for manufacturing panels, wherein said panels at least comprise a substrate and a top layer, wherein said top layer comprises a paper layer having a printed pattern. The panels of the invention may relate to furniture panels, ceiling panels, flooring panels or similar, wherein these panels preferably comprise a wood based substrate, such as an MDF or HDF substrate (Medium or High Density Fiberboard) or a substrate consisting of, or essentially made of, wood particleboard.

2. Related Art

Traditionally, the decor or pattern of such panels is printed on paper by means of offset or rotogravure printing. The obtained paper is taken up as a decorative paper in a so called laminate panel. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well.

Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to the EP 1 290 290, from which it is further known to provide a relief in said melamine surface during the same press treatment or pressing operation, namely by bringing said melamine surface in contact with a structured press element, for example a structured press plate.

The printing of paper by means of an analog printing process, such as by rotogravure or offset printing, at affordable prices inevitably leads to large minimal order quantities of a particular decorative paper and restricts the attainable flexibility. A change of decor or pattern necessitates a standstill of the printing equipment of about 24 hours. This standstill time is needed for exchange of the printing rollers, the cleaning of the printing equipment and for adjusting the colors of the new decor or pattern to be printed.

Providing the printed paper with resin can lead to expansion of the paper, which is difficult to control. Problems can arise, particularly in the cases where, like in the EP 1 290 290, a correspondence between the relief and the printed decor is desired.

With the aim of restricting the costs of decorative paper and of preventing expansion, a method is known, for example from the DE 197 25 829 C1, wherein the analog printing process, for example an offset process, is used to print directly on the plate shaped substrate, whether or not with the intermediary of preparatory layers, such as melamine based layers. The printed decor is finished with melamine based layers and the created whole is cured using a pressing operation. Directly printing on the plate may lead to inferior printing quality. Any inhomogeneity internally in the plate or at its surface has a high risk of telegraphing to the upper surface, thereby forming a visual defect at the surface of the finished decorative panel. The printing process furthermore shows the same problems regarding the attainable flexibility, as when printing on paper. Finally, any quality issue on the print will result in loss of valuable board material.

Instead of analog printing techniques digital printing techniques, especially inkjet printing technique, is becoming increasingly popular for the creation of decors or patterns, be it on paper or directly on a plate-shaped substrate possibly with the intermediary of preparatory layers. Such digital techniques can enhance the flexibility in the printing of decors significantly. Reference is made to the EP 1 872 959, WO 2011/124503, EP 1 857 511, EP 2 431 190 and the EP 2 293 946, where such techniques are disclosed.

The method of the invention more particularly at least comprises the step of providing said paper layer with at least a portion of said printed pattern by means of a digital inkjet printer. Preferably multi color printed patterns are applied for the realization of a decor, e.g. representing a wood pattern, on the abovementioned paper layer. Such decor extends over the majority, or even over the totality of the paper layer. Such a technique is known as such for example from the EP 2 132 041, where a digital printer, more particularly an inkjet printer is applied for printing on a resin provided paper layer. It has however been very difficult to reliably produce such printed paper for manufacturing laminate panels on a large scale and with high production efficiency. Nozzles of the print head may become clogged due to evaporation of the vehicle of the inks and/or due to dust for example origination from the handling of the paper layer. Clogged or failing nozzles in the print heads may lead to unacceptable defaults in the printed pattern. Pretreatment of the paper layer, such as application of resin, in a non-uniform way may lead to unacceptable defects that become visible after printing.

It should be noted that the printing quality desired for the manufacturing of panels having a decorative surface is exceptionally high. Indeed, any default in a printed pattern forming an imitation of e.g. wood immediately draws the attention of the customer, taking away the illusion of e.g. real wood.

SUMMARY OF THE DISCLOSURE

The present invention aims in the first place at an alternative method for manufacturing panels having a decorative surface, and seeks, in accordance with several of its preferred embodiments, to solve one or more of the problems arising in the state of the art.

Therefore the present invention, according to its first independent aspect, relates to a method for manufacturing panels having a decorative surface, wherein said panels at least comprise a substrate and a top layer, wherein said top layer comprises a paper layer having a printed pattern, and wherein said method at least comprises the step of providing said paper layer with thermosetting resin by transporting said paper layer through a resin application device in a resin application direction, and the step of providing said paper layer with at least a portion of said printed pattern by means of a digital inkjet printer, with as a characteristic that said printed pattern comprises a wood motif having wood nerves extending generally in a nerve direction substantially corresponding to said resin application direction. The inventors have found that a method wherein the resin application direction and the nerve direction of the wood motif coincide, or substantially coincide, leads, up to a certain level, to a kind of disguising effect for non-uniform resin application and/or failing nozzles. In other words, the method of the first aspect may forgive some defaults. In real wood color density variations mostly follow the direction of the nerves. If the method of the invention unwillingly leads to a color density variation, chances are high that this variation will be present in the nerve direction or resin application direction and the inadvertent production variation may be mistaken for a natural aspect.

According to its second independent aspect, the present invention relates to a method for manufacturing panels having a decorative surface, wherein said panels at least comprise a substrate and a top layer, wherein said top layer comprises a paper layer having a printed pattern, and wherein said method at least comprises the step of providing said paper layer with thermosetting resin by transporting said paper layer through a resin application device in a resin application direction, and the step of providing said paper layer with at least a portion of said printed pattern by means of a digital inkjet printer, with as a characteristic that the provision of said printed pattern involves a relative motion of said inkjet printer and said paper layer during the printing operation in a printing direction substantially corresponding or substantially opposite to said resin application direction. The inventors have found that a method wherein the printing direction coincides, or substantially coincides with the resin application direction may also have disguising qualities for defaults in the resin application and/or printing.

Of course, the method of said second independent aspect may be combined with the method of said first independent aspect, thereby further raising the level of acceptable defaults in the method. By having the resin application direction, the printing direction and the nerve direction running all in the same or about the same or opposite direction, chances are high that inadvertent production variations will also run along the nerve direction, such that they may be mistaken for color density variations of a natural wood product.

According to its third independent aspect, the present invention relates to a method for manufacturing panels having a decorative surface, wherein said panels at least comprise a substrate and a top layer, wherein said top layer comprises a paper layer having a printed pattern, and wherein said method at least comprises the step of providing said paper layer with an inkjet receiver coating by transporting said paper layer relative to a coater in a coating direction, and the step of providing said coated paper layer with at least a portion of said printed pattern by means of a digital inkjet printer, with as a characteristic that said printed pattern comprises a wood motif having wood nerves extending generally in a nerve direction substantially corresponding to said coating direction and/or that the provision of said printed pattern involves a relative motion of said inkjet printer and said paper layer during the printing operation in a printing direction substantially corresponding or substantially opposite to said coating direction and/or that said method at least comprises the step of providing said paper layer with thermosetting resin by transporting said paper layer through a resin application device in a resin application direction substantially corresponding or substantially opposite to said coating direction. The inventors have found that in case an inkjet receiver coating is applied before printing, non-uniformities may become visible in the printed pattern. The present method proposes the coating direction to coincide, or substantially coincide, with the direction of one or more of the preceding or subsequent operations. In this way again a disguising effect is obtained.

It is clear that the step of providing said paper layer with thermosetting resin may be performed at any time, preceding or subsequent to the coating operation and/or preceding or subsequent the printing operation. Preferably the resin application takes place before the coating operation and, thus, before the printing operation. Preferably, the resin is at least partially cured, e.g. in a so-called B-stage, or dried to a level below 10% residual humidity, upon coating.

According to a preferred embodiment, said step of providing said paper layer with an inkjet receiver coating and said step of providing said paper layer with thermosetting resin are performed continuously on the same line such that said resin application direction and said coating direction coincide. Preferably an equipment is used wherein the paper layer is treated as a continuous web taken from a roll and transported in said resin application direction through one or more resin application devices and one or more coaters for providing said inkjet receiver coating. The treated paper may be cut to sheets at the end of the equipment or be rolled up again. According to an alternative, which may or may not be combined with the said preferred embodiment, said step of providing said paper layer with an inkjet receiver coating and said step of providing said paper layer with at least a portion of said printed pattern by means of a digital inkjet printer are performed continuously on the same line such that said coating direction and said printing direction coincide. Of course the data to be printed may be chosen such that a wood motif is printed having a nerve direction also coinciding with one or more of the coating direction, the resin application direction and the printing direction.

Of course, the method of said third independent aspect may be combined with the method of said second independent aspect and/or said first independent aspect, thereby further raising the level of acceptable defaults in the method.

It is noted that, in accordance with all aspects of the invention, with "substantially coincide" it is meant that a small misalignment between the respective directions, e.g. of 10° or less, may still be allowed with maintaining the benefits of the respective methods of the invention. Of course, such misalignment or intended deviating alignment is preferably as small as possible, for example a deviation of maximum 5°. It is further clear that, in accordance with the invention, opposite directions are also seen as being coinciding or corresponding.

It should be borne in mind that, according to all aspects of the invention, all directions described are relative the paper layer.

Here below, preferred embodiments of the invention, in accordance with any of its aspects are described.

Said step of resin application is preferably performed before the step of printing, although it is not excluded that it would be performed after printing. In the former case the resin is preferably at least partially cured, e.g. in a so-called B-stage, or dried to a level below 10% residual humidity, upon printing. In such case a stable base paper can be obtained, because at least a portion of the expansion or shrinkage due to the resin provision takes place before printing. As a consequence, the formation of relief in the panels top layer by means of techniques similar to the prior art techniques of EP 1 290 290 becomes well feasible. In the latter case, handling of the paper to be printed is more straightforward and less prone to the origination of dust that may lead to clogging and failing nozzles of the print heads.

According to a special embodiment, said step of providing said paper layer with thermosetting resin and/or the optional inkjet receiver coating is performed on a continuous web, while said step of providing said printed pattern is performed on a sheet.

In general, said digital inkjet printer is preferably operated in multi-pass mode, wherein the shuttle moves and prints over the same area of the paper at least twice. A multi-pass operation is beneficial for masking potential missing nozzles. Preferably a subsequent print over the same area is shifted in position with respect to an earlier print, for example over a distance equaling or larger than the distance between nozzles. In such case a different nozzle prints on or close to an earlier printed dot in the subsequent print. It is obtained that a line created in an earlier print, e.g. due to a failing nozzle or a badly calibrated nozzle, is covered up by another nozzle in the subsequent step. With a multi-pass equipment, it is possible to perform automatic maintenance or cleaning in between subsequent passes, when needed, such that the time of autonomous production raises.

Preferably, said inkjet printer comprises print heads mounted on a shuttle, wherein said shuttle travels in said printing direction. Preferably, the paper is at standstill while printing, and is advanced stepwise after printing, wherein said printing may involve several passes of said shuttle. Preferably the width of the shuttle, measured transverse to said printing direction, is at least 8 centimeter, or even better, at least 16 or 20 centimeter. Such shuttle makes it possible to print the whole width of the decorative surface of a common floor panel in one fly, i.e. without having to move the paper layer. Preferably the shuttle allows at least for a travelling distance and printing length of 120 centimeter, or at least 145 centimeter. This allows for printing the whole length of the decorative surface of a common floor panel in one fly. It is clear that said stepwise advancement of the paper after printing is preferably an advancement over a distance of at least one third of the width of said shuttle, and even better between 0.8 and 1.2 times the width of said shuttle.

According to a special embodiment said inkjet printer comprises print heads mounted on a shuttle, wherein said shuttle travels in said printing direction, e.g. as described above, and wherein the print heads comprise at least two heads ejecting ink of the same color and mounted after each other in said printing direction. The print heads might for example comprise a series of print heads, as seen in the printing direction, capable of ejecting inks of a plurality of colors, e.g. at least the four prime colours CMYK, wherein a second series of such print heads is arranged in a mirror inverted manner in said printing direction, leading to a total array of print heads being e.g. CMYKKYMC or CKMYYMKC. With this special embodiment, several advantages are obtained. The redundancy in the print heads deals with failing nozzles up to a larger extent, and in the case of said mirror inverted set-up of the printing heads, the shuttle can print during the back and the forth movement without or with a less noticeable different color density.

For said digital inkjet printer, preferably a so-called wide format printer is selected. It is of course not excluded that a single pass printer would be selected. In this last case the masking effect of multi pass printing operation is lost, but the methods of the invention still allow for a disguising effect.

For said digital inkjet printer, preferably use is made of a drop-on-demand inkjet printer, wherein only the desired ink droplets are fired or jetted from the nozzles of the print heads. It is however not excluded that use would be made of a continuous inkjet printer, wherein continuously ink droplets are fired from the nozzles of the print heads, but wherein the undesired droplets are carried away and do not reach the resin provided paper layer to be printed.

Preferably, for providing said portion of said printed pattern use is made of pigment containing inks, wherein the dry weight of the total volume of said pigment containing inks deposited on said paper layer is 15 grams per square meter or lower. Pigment containing inks provide for a high enough chemical and UV resistance of the printed pattern, and provide an acceptable color richness. As compared to inks consisting of dyes, pigment containing inks assure a lower bleeding into the paper layer. The use of pigmented inks has the advantage that the pigment stays on the surface of the paper. This is desirable, because less ink is needed to create the same intensity of color. The limitation of the dry weight of the applied ink to 15 grams per square meter or less leads to a layer of ink that lowers the risk of pressing defects and splitting in the top layer. Indeed, possible interference between the ink layer and the thermosetting resin during the pressing operation is limited. Because the ink load is limited, wrinkling or expansion of the paper due to the ink can be brought to an acceptable level, which assures stable further processing. Preferably, for said pigment containing ink use is made of a water based ink. Water based inks are more economical than UV curable inks, and form a lesser problem regarding compatibility with thermosetting resins, such as melamine resins. Water based inks are inks of which the vehicle comprises water, or substantially consists of water. These inks are particularly crucial when it comes to clogging of the nozzles, since the vehicle may be evaporate at normal temperatures, and the pigments load the nozzle opening until it is stuck. It is clear that the methods of the invention offer several ways of dealing with this risk of defaults, such that a more reliable and autonomous production may be obtained.

Preferably, a separate ink receiving substance or ink receiving layer is available on the paper layer, upon printing. With "separate" it is meant separate from the resin provided or to be provided on the paper layer. Preferably, said paper layer, prior to said step of providing said printed pattern, is provided with an inkjet receiver coating on the side thereof to be printed. Such inkjet receiver coating may further limit bleeding of the preferred water based pigment containing ink upon printing. The water of the ink can be quickly absorbed into the ink receiver coating, while the pigment is caught at its surface. The inkjet receiver coating may lead to less wrinkling of the printed paper sheet. Said inkjet receiver coating may have several compositions. Here below a preferred possibility for the composition of the inkjet receiver coating is given without being exhaustive.

According to a said preferred possibility, said inkjet receiver coating comprises at least a hydrophilic polymer, e.g. polyvinyl alcohol which is preferably at least partially but even better fully hydrolyzed.

Possibly pigments are comprised in said inkjet receiver coating, such as silica pigments, preferably amorphous and/or fumed silica pigments. When pigments are comprised in the inkjet receiver coating, a polymer, like the above hydrophilic polymer, may be acting as a binder for said pigments. Preferably, the pigment to binder ratio is comprised between 10:90 and 90:10, more preferably higher than 1.5:1. These preferred ratios of pigment to binder provide for sufficiently well bound pigments, such that the treated paper releases few dust. An excess of dust may be fatal for clogging of the nozzles of the inkjet printing equipment, especially in the case where water based inks are being used. Preferably said pigment is a porous pigment having a pore volume of between 0.5 and 3 ml/g, preferably Silica.

In general, when a pigment is applied in said inkjet receiver coating, it preferably has a mean particle size of 0.01 to 40 micrometer or 0.01 to 10 or 0.01 to 5 micrometer, and/or a pore volume of 0.5 to 3 ml/g.

The methods of the invention are especially valuable when an inkjet receiver coating comprising pigments is used. As explained above, such coatings may give rise to dust and, as a result, clogged or failing nozzles, even if it is relatively well bound by the optional polymer or binder.

The inkjet receiver coating preferably has a dry weight of 0.5 to 10 grams per square meter, or even better between 1 and 6 grams per square meter or between 1.5 to 4.5 grams per square meter. Such a weight of the inkjet receiver coating represents a thickness which is sufficient to take up the water from the preferred water based pigment containing inks, but is still thin enough to allow for the thermosetting resin to penetrate it during the pressing treatment, e.g. in a DPL process, such that any risk for splitting in the inkjet receiver layer is limited.

Preferably the inkjet receiver coating is obtained from a liquid substance which is deposited on the paper, and preferably forcibly dried e.g. in a hot air oven or by means of infrared or near infrared light or by means of microwave drying. Preferably the liquid substance is a water based suspension of at least said binder or hydrophilic polymer, and possibly said pigments. The deposition is preferably obtained by means of coating techniques, such as roller coating, spraying, metering rolls, bead coating, scattering, slot die coating and screen printing. With these techniques preferably a coating is obtained that covers at least 80% of the surface of the paper layer. Preferably an excess of the liquid substance is firstly applied to the paper layer, and afterwards the excess material is taken off again, e.g. squeezed off, until the desired weight is obtained. Inline measurement systems may be desirable to steer and control the weight of the inkjet receiver coating. Such technique brings down the risk of obtaining uncoated areas of the paper, which could lead to local flaws in the printed pattern. A preferred equipment for application of the liquid substance is a coating device comprising reverse metering rollers. Such rollers may create a smooth coating surface.

The deposition of the liquid substance may be performed in an impregnation channel or, alternatively, on the printing equipment, immediately before the printing operation. This last case solves any possible issues with limited shelf life of the inkjet receiver coating. Preferably the deposition of the liquid substance is performed while the paper is still in an "endless" shape, namely taken from the roll without cutting. Such techniques allow for a more uniform application of the inkjet receiver coating. In the case the coating is done on the printing equipment, the printing equipment is hence preferably a roll-to-roll or a roll-to-sheet printer, comprising a coating device upstream of the print heads, for example a roller coater or additional printing heads suitable for printing the liquid substance for the inkjet receiver coating. Such additional printing heads, for example an additional row of printing heads, may have nozzles with a larger diameter than those used for the actual printing of the pattern. A resolution of 1 to 100, or even 1 to 25 dots per inch may suffice for these nozzles. The larger diameter allows for the jetting of more viscous substances. These additional printing heads may e.g. be valve jet printing heads.

Said liquid substance preferably comprises a solid content of 1 to 20% by weight and/or a viscosity of 10 to 75 seconds Din cup 4 at 20° C. Such properties allow for a straightforward application of the liquid substance to the surface of the paper layer, which is preferably already provided with thermosetting resin. In experiments, a solid content of about 12% and viscosity of about 24 seconds yielded a sufficiently uniform coating on a resin provided paper layer, e.g. when applied by means of a roller coater.

Said liquid substance may comprise, in addition to the above possible constituents of the inkjet receiver coating, at least a leveling agent, a preservative, an antifoaming agent, a dispersing agent, a hardener and/or a thickener. It is clear that the availability of a leveling agent gives rise to a more uniform coating, which is beneficial for the printing result.

For the leveling agent use could be made of APEO (alkyl phenol ethoxylates) or fatty alcohols or Oxo alcohol ethoxylates. For the preservative use could be made of BIT or MIT (benzisothiazolinone or methylisothiazolinone). For the antifoaming agent use could be made of polyether siloxane copolymer. For the hardener use could be made of borate. For the thickener use could be made of HEC (hydroxyethyl cellulose). For the dispersing agent use could be made of sodium aluminate, polyphosphates or acrylates.

Preferably said paper layer has a paper weight, i.e. without taking into account the resin provided on it, of between 50 and 100 grams per square meter and possibly up to 130 grams per square meter. The weight of the paper may not be too high, as then the amount of resin needed to sufficiently impregnate the paper would be too high, and reliably further processing the printed paper in a pressing operation becomes badly feasible.

Preferably for the paper layer use is made of a paper with a mean air resistance according to the Gurley method (Tappi T460) of below 30 or even better of about 25 seconds or below. Such paper has a rather open structure and is advantageous in the method of the present invention as it allows readily for impregnation of its core, as well as for water vapor to escape from it upon pressing. Such water vapor originates from the resin-water mixture that is provided on the paper layer, as well as from possibly from the curing reaction of the thermosetting resin.

Preferably said paper layer contains titanium oxide as a whitening agent.

Preferably said paper layer is provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

Preferably said paper layer is provided with such an amount of thermosetting resin, that at least the paper core is satisfied with the resin. Such satisfaction can be reached when an amount of resin is provided that corresponds to at least 1.5 or at least 2 times the paper weight. It should be clear that the resin which is provided on the paper layer, is not necessarily only available in the core of the paper, but may form surface layers on both flat sides of the paper. In the case an inkjet receiver coating is applied, it may be present on the surface of the paper with the intermediary of such a surface layer of thermosetting resin. According to a special embodiment, the paper layer is firstly impregnated through or satisfied, and, afterwards, at least at the side thereof to be printed, resin is partially removed and possibly said inkjet receiver coating is provided.

Preferably the resin provided on said paper layer is in a B-stage while printing. Such B-stage exists when the thermosetting resin is not completely cross linked.

Preferably the resin provided on said paper has a relative humidity lower than 15%, and still better of 10% by weight or lower while printing.

Preferably the step of providing said paper layer with thermosetting resin involves applying a mixture of water and the resin on said paper layer. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or doctor blades to set the amount of resin added to the paper layer.

Preferably said thermosetting resin is a melamine based resin, more particularly a melamine formaldehyde resin with a formaldehyde to melamine ratio of 1.4 to 2.

As is clear from the above, the method of the invention preferably comprises the step of hot pressing the printed and resin provided paper layer, at least to cure the resin of the obtained resin provided decor paper. Preferably the method of the invention forms part of a DPL process as above described, wherein the printed resin provided paper layer of the invention is taken up in the stack to be pressed as the decorative layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

Preferably a further resin layer is applied above the printed pattern after printing, e.g. by way of an overlay, i.e. a resin provided carrier layer, or a liquid coating, preferably while the decor layer is laying on the substrate, either loosely or already connected or adhered thereto.

Clearly, the method of the invention preferably comprises the step of providing said layer of thermosetting resin above the printed pattern. Said layer of thermosetting resin provides for a transparent or translucent layer that enhances the wear resistance of the decorative panel. Preferably the decorative panel obtained by the method of the invention has a quality of at least AC2 or AC3 in accordance with EN 13329. With this aim hard particles, like aluminiumoxide particles, can be incorporated in such transparent or translucent layer. Preferably the step of providing said layer of thermosetting resin above the printed pattern involves a press treatment. Preferably a temperature above 150° C. is applied in said press treatment, e.g. between 180° and 220° C., and a pressure of more than 20 bar, e.g. between 35 and 40 bar.

Preferably use is made of pigment containing inks of between 3 and 6 or even up to 8 different colors. The use of more than just the at least 3 base colors, e.g. more colors than Cyan, Magenta, Yellow and possibly black (CMYK), may lead to a lower need of deposited ink. One or more dedicated colors, whether or not supplementing the inks of the CMYK colors, might be used, such that these colors must not necessarily be formed by color addition of the several base colors, but can be created by jetting the dedicated color only. In the case of wood patterns, a brownish dedicated color might be used, thereby tremendously lowering the needed dry weight of deposited inks for the typical colors of wood patterns.

Preferably a digital inkjet printer is applied that allows to jet ink droplets with a volume of less than 50 picoliters. The inventors have found that working with droplets having a volume of 15 picoliters or less, for example of 10 picoliters, brings considerable advantages regarding the limitation of dry weight of deposited inks.

Preferably a digital inkjet printer is applied that allows to attain a definition of at least 200 dpi, or even better at least 300 dpi (dots per inch).

Preferably said digital inkjet printer is of the so-called roll-to-sheet type, wherein the paper layer is fed from a roll, printed upon, and subsequently cut to sheets. According to a first alternative the paper layer is fed from a roll, printed upon, and rolled back up again. According to a second alternative the paper is fed in sheet form, printed upon, and stacked sheet by sheet, e.g. on a pallet.

Preferably the minimum radius over which the paper is bent in the printing equipment is larger than 25 centimeters, or even better larger than 50 centimeters. Preferably the paper layer to be printed is maintained flat or relatively flat in the printing equipment. Avoiding too large a bent in the paper, prevents the release of dust from the paper, and optionally the resin and/or inkjet receiver coating, as well as cracking of the optional resin and/or inkjet receiver coating to a large extent. By keeping the paper relatively flat in the printing equipment, the risk that nozzles get clogged by released dust is minimized and deterioration of the print quality due to cracks in the paper, resin and/or inkjet receiver coating is minimized. It is clear that this measure is also beneficial when it is not combined with one or more of the aforementioned aspects. Therefore, in accordance with a fourth aspect, the present invention, in an independent manner, also relates to a method for manufacturing panels having a decorative surface, wherein said panels comprise a substrate and a top layer, wherein said top layer comprises a paper layer having a printed pattern, and wherein said method at least comprises the step of providing said paper layer with thermosetting resin and/or an inkjet receiver coating, and the step of providing said paper layer with at least a portion of said printed pattern by means of a digital inkjet printer, with as a characteristic that said paper layer is maintained flat or is devoid from bents with a radius larger than 25 centimeters inside the printing equipment, or in other words, inside the housing that contains the print heads. It is clear that said inkjet receiver coating and, preferably also said resin, is provided on the paper layer, upon printing. It is further clear that preferred embodiments mentioned in connection to the first, second and third aspect could also be put to be practice in combination with this fourth aspect.

It is clear that, according to the most preferred embodiment of all aspects, the paper layer, while printing, is still flexible and that the paper layer is only attached or put on the plate shaped substrate after printing. According to a variant the paper layer is already attached or loosely laid on the plate shaped substrate while printing. The possible attachment with the substrate can be reached by means of urea based, phenol based, melamine based, polyurethane based glues and similar adhesives. Such attachment can be attained by means of a pressing treatment, whether or not a heated press treatment. Alternatively, the paper layer, after it has been provided with resin can be attached to the plate shaped substrate by locally welding it to the substrate, or, in other words, by locally hardening the available resin, and/or can be attached to the plate shaped substrate by ionization.

Preferably the methods of the invention further comprise the step of applying a counter layer or balancing layer at the surface of the substrate opposite the printed paper layer. The counter layer or balancing layer preferably comprises a paper layer and thermosetting resin, preferably the same resin as the top layer.

Preferably the mutual adherence of the plate-shaped substrate, the possible counter layer and the possible transparent or translucent layer is obtained in one and the same press treatment. According to the most preferred embodiment, the steps of the method of the invention are taken up in a DPL process.

It is clear that the invention also concerns panels that are obtained or are obtainable by means of a method in accordance with any of the aspects of the present invention. It is further clear that the method is particularly suited to manufacture floor panels, furniture panels, ceiling panels and/or wall panels.

It is clear that the printed pattern, the plate-shaped substrates and the paper layers mentioned above may have to be divided during the methods of the invention for obtaining their respective final dimensions. The panels obtained by means of a DPL press treatment or similar are preferably sawn or otherwise divided. Other treatments of the obtained panels are of course not excluded.

BRIEF DESCRIPTION OF THE DRAWINGS

With the intention of better showing the characteristics according to the invention, in the following, as an example without limitative character, several preferred embodiments are described, with reference to the accompanying drawings, wherein:

FIGS. 3 and 4 show a decorative panel obtainable by means of the method of FIG. 2, wherein FIG. 3 is a perspective view of said panel, and FIG. 4 is a cross section at a larger scale along the line IV-IV in FIG. 3;

DESCRIPTION OF NON-LIMITING EMBODIMENTS

Figure 1:
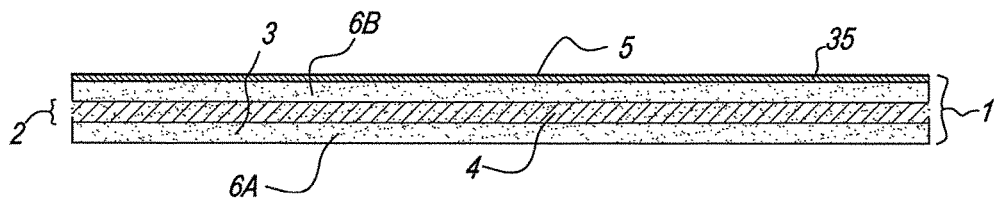
FIG. 1 shows an embodiment of a paper layer that has been printed in accordance with the method of the invention.

FIG. 1 illustrates a decorative layer 1 for incorporation in a decorative panel, obtainable by means of a method in accordance with the invention. The decorative layer 1 comprises a paper sheet 2 provided with thermosetting resin 3. The thermosetting resin 3 satisfies or fills the paper core 4. The paper layer has been provided with a digitally printed ink layer 5 on the basis of pigment containing inks, wherein for these inks use is made of water based pigment containing inks and an ink load lower than 15 grams per square meter area of the paper sheet 2. The printed ink layer 5 covers the entire surface of the paper sheet 2, or at least the majority thereof.

FIG. 1 also clearly shows that at least at the side opposite the digitally printed ink layer the decorative layer 1 comprises a resin layer 6A outside the paper core 4. At the side that contains said digitally printed ink layer 5 a similar resin layer 6B is available. Possibly such resin layer 6B can be dispensed with, or the available resin layer 6B may be thinner, for example less than half the thickness of the resin layer 6A.

From FIG. 1 it is clear that the digitally printed ink layer 5 covers the majority of the papers surface. Such print might for example represent a wood pattern, a stone pattern or a fantasy pattern.

Figure 3:
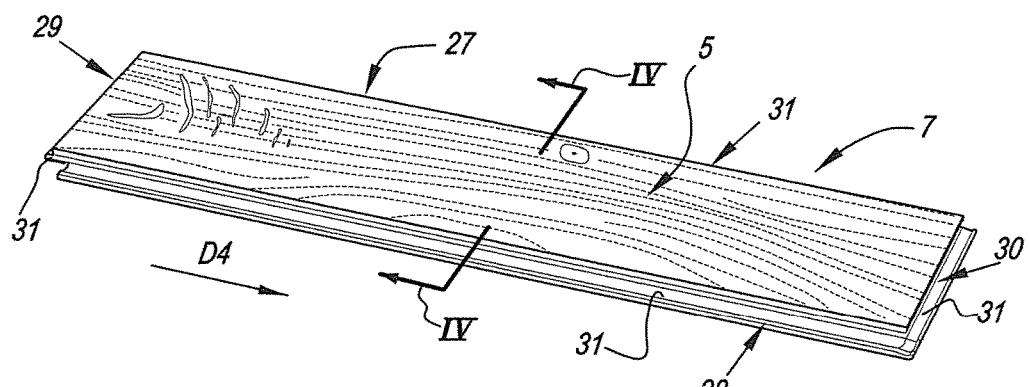
Figure 4:
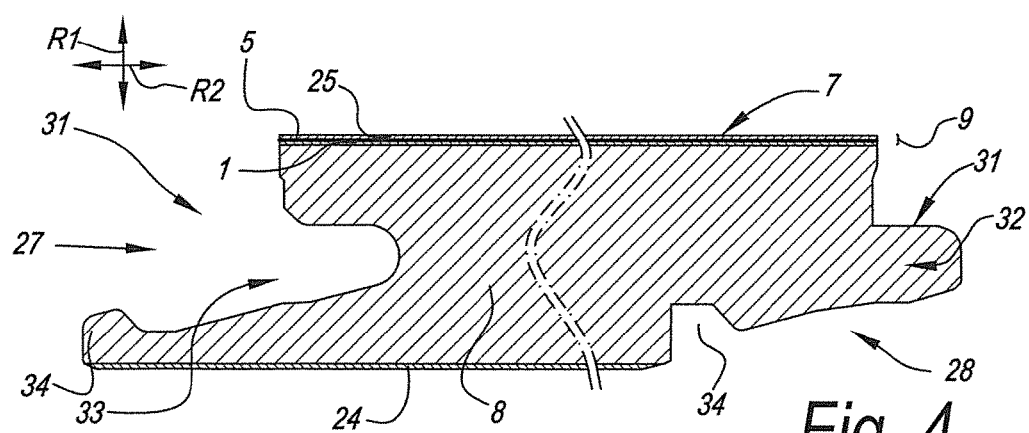
Figure 2:
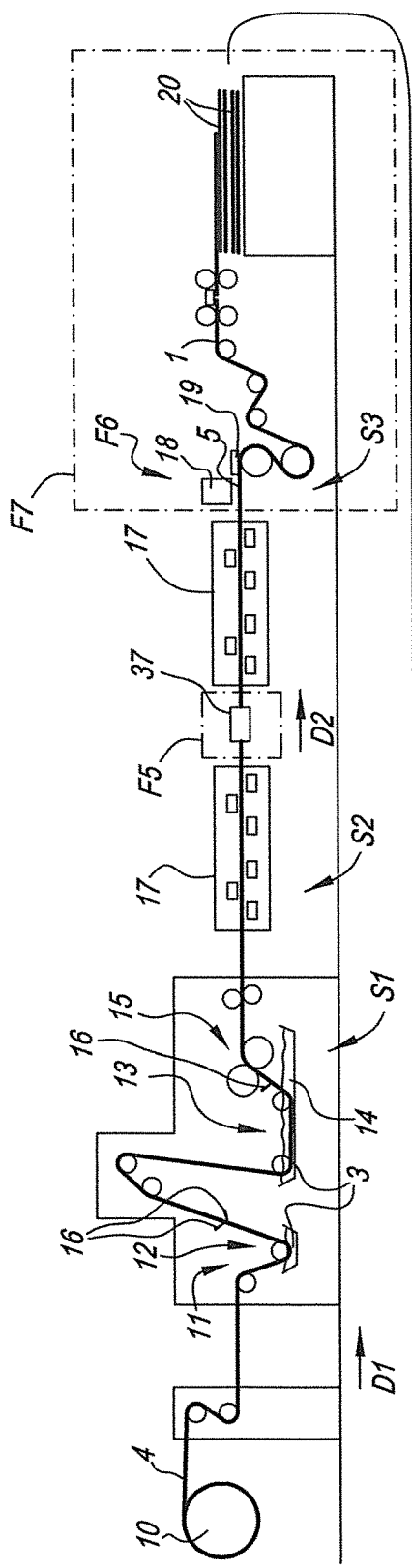
FIG. 2 illustrates some steps of a method in accordance with the invention.
Figure 2:
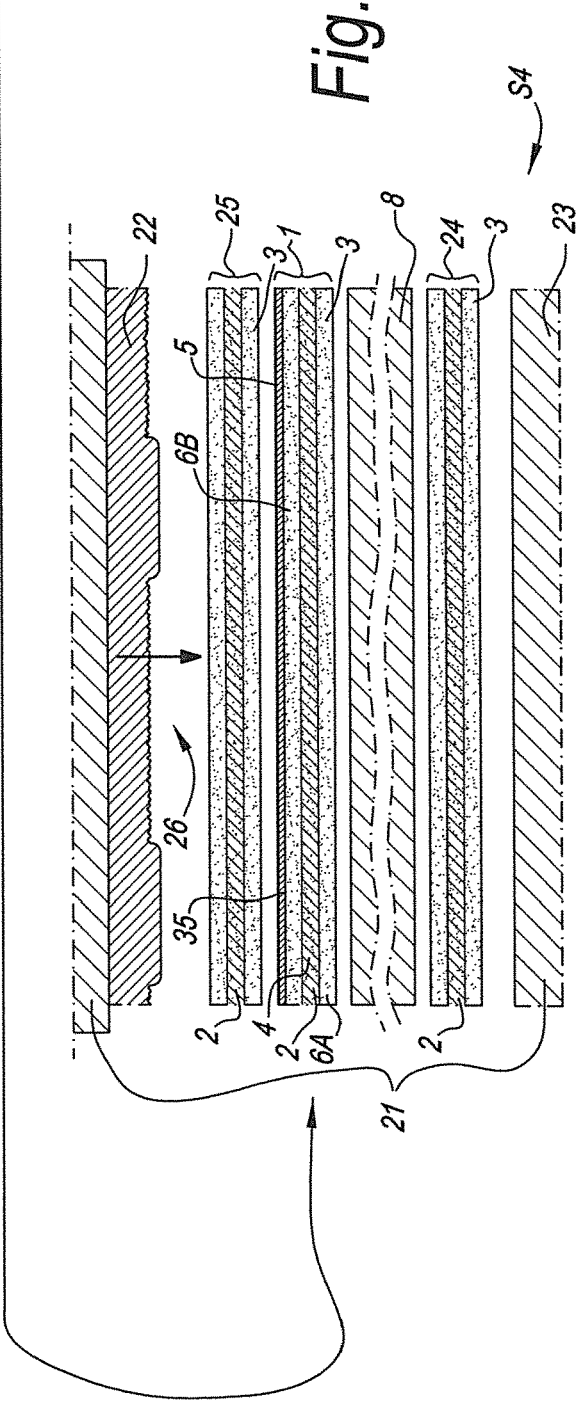

FIG. 2 illustrates a method for manufacturing decorative panels 7 of the type shown in FIGS. 3 and 4. The obtained decorative panels 7 at least comprise a substrate 8 and a top layer 9. The top layer comprises a paper layer 2 with a printed pattern or a digitally printed ink layer 5 representing a wood pattern, as is the case here. The method comprises the step S1 of providing said paper layer 2 with thermosetting resin 3. Hereto the paper layer 2 is taken from a roll 10 and transported in a resin application direction D1 through a resin application device comprising a first impregnation station 11 where said paper layer is immersed in a bath 12 of said resin 3, more particularly a mixture of water and resin 3. The paper layer 2 is then allowed to rest while in this case being transported upwards. The resting allows for the resin 3 to penetrate the paper core 4. The paper layer 2 then comes into a second impregnation station 13 where the paper layer 2 is, in this case, again immersed in a bath 14 of resin 3, more particularly a mixture of water and resin 3. A set of squeezing rollers 15 allows to dose the amount of resin 3 applied to the paper layer 2.

In the example several doctor blades 16 are available for partially removing resin at the surface of the treated paper layer 2.

In a second step S2 the resin provided paper layer 2 is dried and its residual humidity level is brought to below 10%. In the example hot air ovens 17 are used, but alternatively other heating equipment can be used, such as microwave drying equipment.

FIG. 2 also illustrates that the method at least comprises the step S3 of providing said resin provided paper layer 2 with a printed pattern, in this case a digitally printed ink layer 5 representing a wood pattern. Use is made of pigment containing inks, that are deposited on the paper layer 2 by means of a digital inkjet printer 18, in this case a single pass inkjet printer having print heads extending over the width of the paper layer 2. The dry weight of the total volume of pigment containing inks deposited on said paper layer 2 is lower than 15 grams per square meter. The inkjet printer is preferably a drop on demand printer that allows to dry the deposited droplets of pigmented ink, e.g. by means of infrared or near infrared light. Preferably a further drying station 19 is provided downstream of the printer 18. After printing and drying the inks the continuous paper layer 2 is cut to sheets 20 and stacked. The obtained sheets 20 resemble the decorative layer 1 illustrated in FIG. 1.

FIG. 2 further illustrates that in a subsequent step S4 the obtained sheets 20 or the decorative layer 1 is taken up in a stack to be pressed in a short daylight press 21 between upper and lower press plates 22-23. Said stack comprises from bottom to top a counter layer 24, a plate shaped substrate 8, the abovementioned decorative layer 1 and a protective layer 25, wherein the counter layer 24 and the protective layer 25 both comprise a paper layer 2 and resin 3. The stack is then pressed and the press treatment results in a mutual connection between the constituent layers 1-8-24-25, including the substrate 8, of the stack, as well as in a hardening or curing of the available resin 3. More particularly here a polycondensation reaction of the melamine-formaldehyde resin 3 takes place, having water as a by-product.

The upper press plate 22 is a structured press plates that provides a relief in the melamine surface of the panel 1 during the same press treatment of the step S4, by bringing the structured surface 26 of the upper press plate 22 into contact with the melamine of the protective layer 25.

FIGS. 3 and 4 illustrate that the obtained decorative panel 7 can have the shape of a rectangular and oblong laminate floor panel, with a pair of long sides 27-28 and a pair of short sides 29-30 and having an HDF or MDF substrate 8. In this case the panel 7 is at long at least the long sides 27-28 with coupling means 31 allowing to lock the respective sides 27-28 together with the sides of a similar panel both in a direction R1 perpendicular to the plane of the coupled panels, as in a direction R2 perpendicular to the coupled sides and in the plane of the coupled panels. As illustrated in FIG. 4 such coupling means or coupling parts can basically have the shape of a tongue 32 and a groove 33, provided with additional cooperating locking means 34 allowing for said locking in the direction R2.

Referring again to FIG. 1, it becomes clear that the printed paper layer 2 illustrated there has been provided with an inkjet receiver coating 35.

Figure 5:
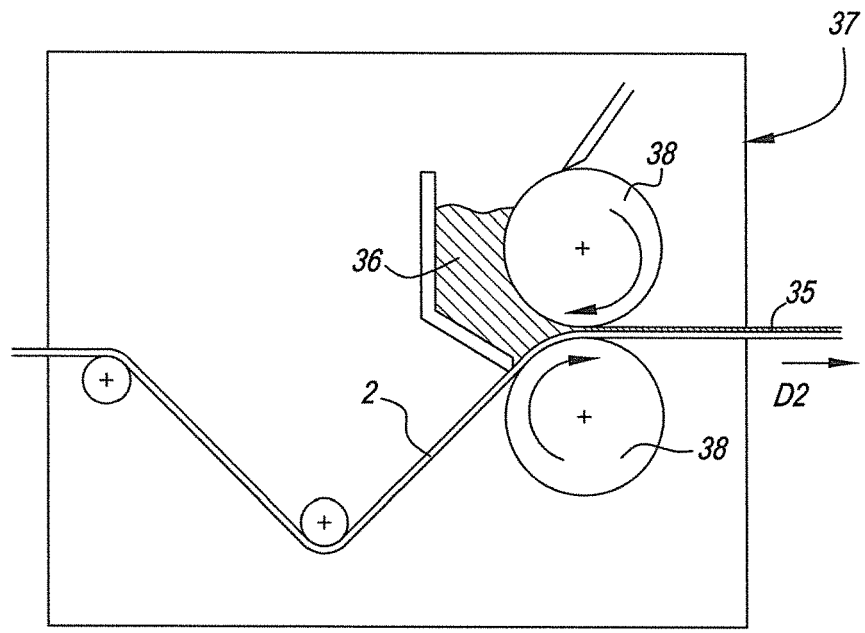
FIG. 5 on a larger scale shows a view on the area F5 indicated on FIG. 2 for a variant, wherein an inkjet receiver coating is being applied to the paper layer.

FIG. 5 shows that, in accordance with a preferred embodiment, the inkjet receiver coating 35, is obtained by coating a liquid substance 36 to the resin provided paper layer 2. In this case the paper layer 2 is transported in a coating direction D2 relative to a coater 37. A coater 37 comprising reverse metering rollers 38 is applied. Such coater 37 may initially apply an excess of the liquid substance 36, which is squeezed off to the desired weight by means of the rollers 38, which also may provide for a smooth coating surface. It is clear that, in this case and in accordance with the third aspect of the invention, the resin application direction D1 and the coating direction D2 coincide.

From FIG. 2 it can be gleaned that the coater 37 is present on the resin application device or impregnation line, more particularly in this case after a drying operation, here performed by means of a hot air oven 17. Preferably, the resin provided paper layer possesses a residual humidity of below 10% by weight, or even lower than 6%, when the liquid substance 36, which is preferably a water based suspension of at least a polymer, is applied thereto. Preferably, and as is the case in FIG. 2, the treated paper layer 2 is then dried again, here again by means of a hot air oven 17, to reach once more a residual humidity level of below 10%, or of about 7%. The obtained treated paper comprises an inkjet receiver coating 35 which is free from thermosetting resin.

Figure 6:
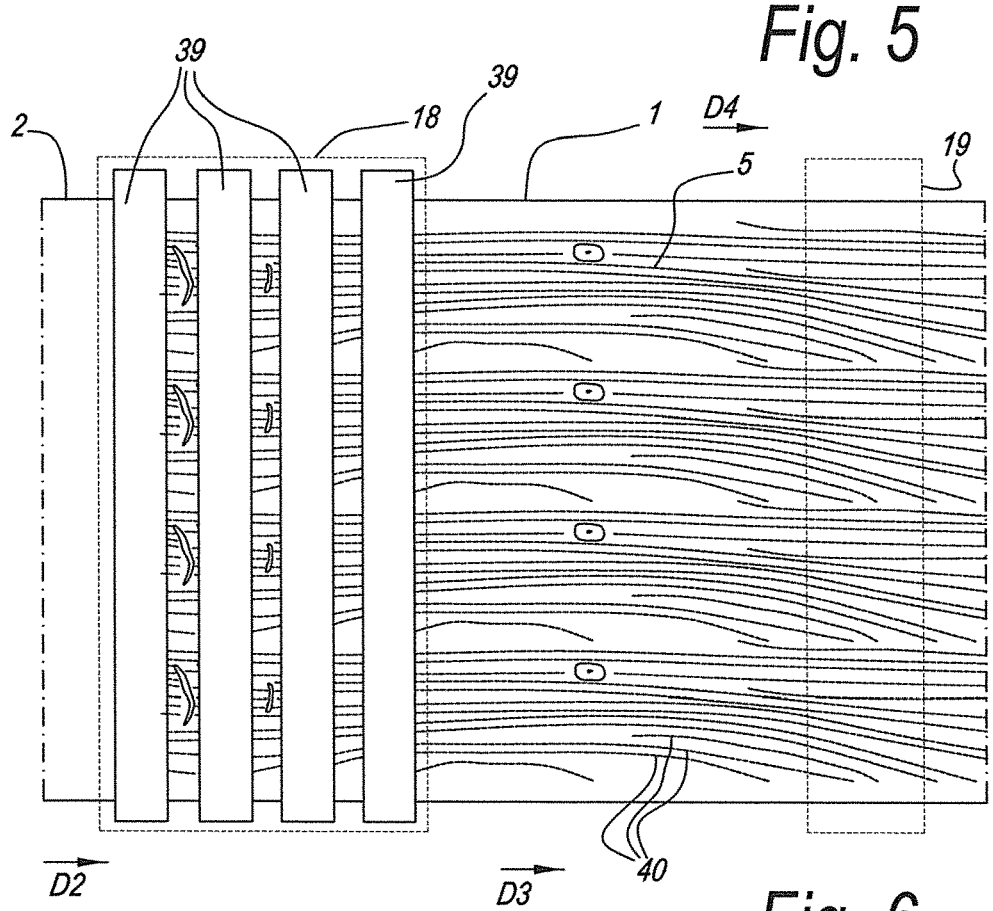
FIG. 6 on a larger scale shows a top view according to the arrow F6 on FIG. 2.

FIG. 6 illustrate that the printer 18 in this example comprises several rows 39 of print heads that extend over the area of the paper layer 2 to be printed. The printer 18, in this example, relates to a printer of the single pass type, wherein the provision of the printed pattern involves a relative motion of said inkjet printer 18, more particularly the rows 39, and said paper layer 2 during printing in a printing direction D3. In this case, the rows 39 and the print heads are at standstill, while the paper layer 2 moves during ejection of the inks. The paper layer 2 gets printed during a single continuous movement of the paper layer 2 relative the printer 18 or the rows 39 of print heads. In this case, in accordance with the second aspect of the invention, the printing direction D3 coincides with the resin application direction D1.

The printed pattern comprises a wood motif having wood nerves 40 extending generally in a nerve direction D4. In this case, and in accordance with said first aspect of the invention, the nerve direction D4 corresponds to said resin application direction D1. The nerve direction further corresponds to said coating direction D2.

Figure 7:
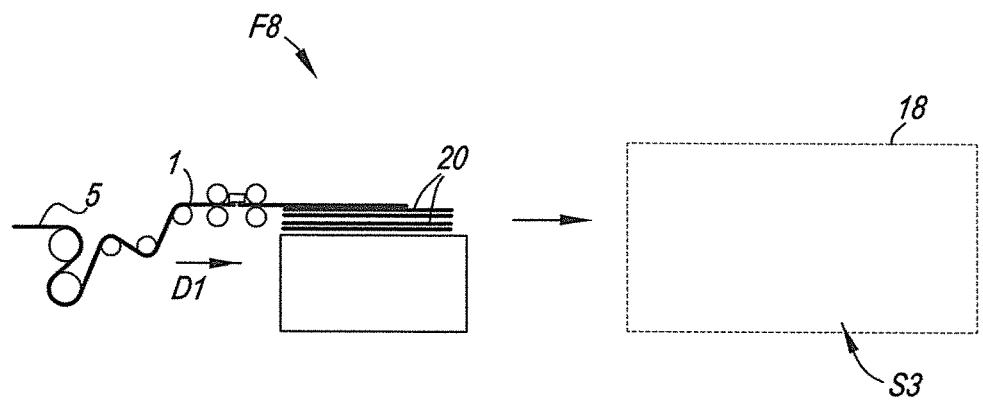
FIG. 7 represents a variant of the area F7 indicated on FIG. 2.

FIG. 7 illustrates a variant, wherein the step of printing S3 and/or the curing of the ink might be carried out after the resin provided paper layer 2 is already cut to sheets 20. According to a non-illustrated variant, the resin provided paper layer 2 might be rolled up again before cutting it to sheets and/or before printing.

Figure 8:
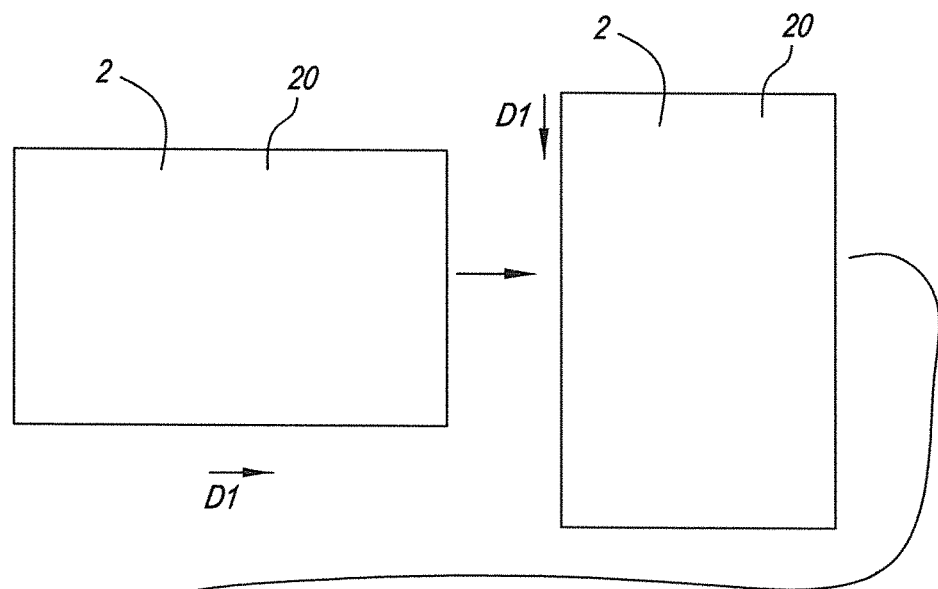
FIG. 8 is a top view at a larger scale according to the arrow F8 on FIG. 7.
Figure 8:
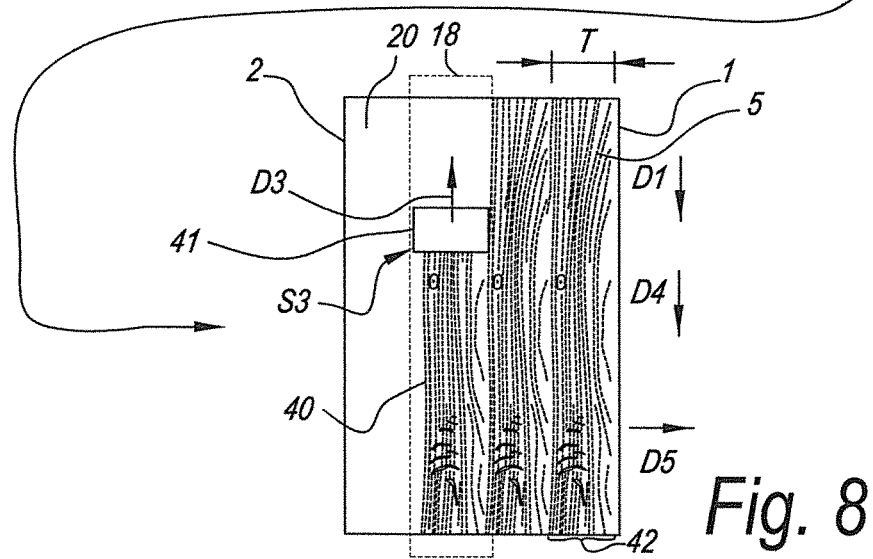

FIG. 8 shows that the printer 18 may comprise a shuttle 41 travelling in the printing direction D3, wherein this printer 18 might be operated in the dual or multi-pass mode. In the example the shuttle 41 is able to print a swath 42 with a width T sufficient to cover the surface of a decorative panel 7 like the floor panel of FIG. 3. A width T of 15 or 16 to 25 or 30 centimeters may suffice. During the printing of the swath 42 the paper layer 2 is at standstill. The printing may comprise several passes of the shuttle 41 over the paper layer 2. It is possible for the shuttle 41 to print during the back-, as well as during the forth-movement, or only during one of the back-and-forth-movements. In between passes the shuttle 41 may slightly shift in the direction D5 transverse or perpendicular to the printing direction D3, e.g. over a distance larger than the distance between the nozzles of the print head. After completion of the swath the paper layer 2 advances in the direction D5 to enable the shuttle to print over a subsequent area of the paper layer 2.

It is clear that such swath 42 may comprise a plurality of separate, independent, wood motifs situated next to each other in the direction D5, and/or after each other in said printing direction D3.

It is clear that, in the example of FIG. 8, the resin application direction D1, the coating direction D2, the printing direction D3 and the nerve direction D4 all correspond or coincide. Of course, the figure shows the printing direction D3 to be opposite the resin application direction D1 and the coating direction D2, however, in the light of the present disclosure, it is clear that the same effects are reached with regard to disguising defects or non-uniformities and that an opposite direction therefore should be seen as coinciding as well.

The embodiment of FIG. 8 has the further advantage that very long wood motifs can be printed. Indeed, the length of the obtainable wood motif as measured along the nerve direction D3 depends on at what length the sheets 20 are cut from the roll 10 and the available travelling stretch of the shuttle 41. This may well be longer than 2.08 meters, e.g. more than 2.5 meters or even up to 2.8 meter or more, preferably between 2.5 and 5.6 or 5.7 meter. The standard width of a roll of paper is 2.08 meters and available wood prints without repeat in the motif are at maximum this length. In such case, the wood motif is notably printed in the width direction of the roll 10 using rotogravure printing. The present invention allows to obtain a wood motif with a length in nerve direction D4 larger than 2.08 meters oriented in the length direction of the roll 10, or in the resin application direction D1, coating direction D2.

It is clear that according to a special independent aspect of the present invention, it relates to a method for manufacturing panels having a decorative surface, wherein said top layer comprises a paper layer having a printed pattern, and wherein said method at least comprises the step of providing said paper layer with thermosetting resin, and the step of providing said resin provided paper layer with at least a portion of said printed pattern by means of a digital inkjet printer, with as a characteristic that said printer comprise a shuttle having a width of at least 10 centimeters, preferably between 10 and 65 centimeters, or even better of at least 15 or 16 centimeters, preferably between 15 and 30 centimeters. Preferably such shuttle has a travelling length of at least 2.5 meter, preferably between 2.5 and 5.7 meter or between 2.5 and 3 meter. Such dimensions allow for an ideal incorporation of such methods in a lamination process, like a DPL process. Preferably said shuttle moves in a printing direction D3 coinciding with the resin application direction D1. Preferably said printed pattern is a wood motif having a nerve direction D4 extending substantially along said printing direction D3.

Of course, where in the above, the width of the shuttle 41 is mentioned, reference is in fact made to the width T of the swatch 42 that the shuttle is capable of printing, as measured transverse to the printing direction D3.

FIGS. 6 and 8 further illustrate that the paper layer 2 travels through the printer 18, while maintained the paper layer 2 flat.

The present invention is in no way limited to the above described embodiments, but such methods may be realized according to several variants without leaving the scope of the invention.

The invention claimed is:

1. A method for manufacturing floor panels having a decorative surface, wherein the floor panels at least include a substrate and a top layer, wherein the top layer includes a paper layer having a printed pattern, the method comprising:
    providing the paper layer with an inkjet receiver coating by transporting the paper layer relative to a coater in a coating direction;
    wherein the inkjet receiver coating is free from thermosetting resin;
    wherein the inkjet receiver coating includes a hydrophilic polymer and pigments;
    wherein the hydrophilic polymer binds the pigments into the inkjet receiver coating;
    wherein the hydrophilic polymer is polyvinyl alcohol; and
    wherein the pigments are silica particles;
    providing the coated paper layer with at least a portion of the printed pattern using a digital inkjet printer;
    wherein the printed pattern comprises a wood motif having wood nerves extending generally in a nerve direction substantially corresponding to the coating direction;
    wherein providing the printed pattern involves a relative motion between the digital inkjet printer and the paper layer during a printing operation in a printing direction substantially corresponding or substantially opposite to the coating direction; and
    wherein the digital inkjet printer includes print heads mounted on a shuttle, wherein the shuttle travels in the printing direction, the width of the shuttle being at least 8 centimeters and sufficient to cover the decorative surface of the floor panel.

2. The method according to claim 1, wherein the shuttle has a width between 10 and 65 centimeters and a travelling length between 2.5 and 5.7 meters.

3. The method according to claim 1, further comprising providing the paper layer with thermosetting resin by transporting the paper layer through a resin application device in a resin application direction, the nerve direction substantially corresponding to the resin application direction.

4. The method according to claim 3, wherein providing the paper layer with an inkjet receiver coating is performed subsequent to providing the paper layer with thermosetting resin.

5. The method according to claim 3, wherein providing the paper layer with an inkjet receiver coating and providing the paper layer with thermosetting resin are performed continuously on the same line such that the resin application direction and the coating direction coincide.

6. The method according to claim 3, wherein providing the paper layer with the portion of the printed pattern is performed subsequent to providing the paper layer with thermosetting resin.

7. The method according to claim 3, wherein providing the paper layer with thermosetting resin is performed on a continuous web, while providing the printed pattern is performed on a sheet.

8. The method according to claim 1, wherein the shuttle performs back-and-forth movements in the printing direction with the shuttle printing during the back-movements and the forth-movements; and
    wherein, in between passes, the shuttle is shifted in a direction transverse to the printing direction over a distance equal to or larger than the distance between nozzles of the print head.

9. The method according to claim 1, wherein the print heads include at least two heads ejecting ink of the same color and mounted after each other in the printing direction.

10. The method of according to claim 9, wherein the print heads include a series of print heads arranged in the printing direction, the series of print heads configured to eject inks of the four prime colors CMYK; and
    wherein a second series of such print heads is arranged in a mirror inverted manner in the printing direction.

* * * * *